Oct. 24, 1939.   G. E. BUSSIERES ET AL   2,177,017
AUTOMATIC CLUTCH OPERATING MECHANISM
Filed Nov. 4, 1938

Inventors:
Georges Emile Bussières
& Jean Maurice Bussières

Patented Oct. 24, 1939

2,177,017

UNITED STATES PATENT OFFICE 2,177,017

AUTOMATIC CLUTCH OPERATING MECHANISM

Georges Emile Bussieres and Jean Maurice Bussieres, Notre-Dame de Charny, Quebec, Canada Application November 4, 1938, Serial No. 238,832

6 Claims. (Cl. 192—.01)

The present invention pertains to a novel automatic clutch operating mechanism, and the principal object is to provide a device of this character in a motor vehicle or the like, whereby the clutch is automatically disengaged when the gear shift lever is moved in either direction out of its neutral position.

The invention not only simplifies the operation of a motor vehicle, but avoids damage to the mechanism by persons learning to drive a car. Such beginners frequently strip gears or otherwise damage the transmission or rear axle by attempting to shift gears without disengaging the clutch. Such accidents cannot occur with the present invention, since it provides means for automatically disengaging the clutch when the gear shift lever is actuated.

In the accomplishment of these objects, the invention comprises a hydraulically operated piston adapted to disengage the clutch when the pressure fluid is delivered thereto. The cylinder containing the piston is supplied with the fluid from a tank of compressed air carried by the vehicle. There is also an outlet line extending from the cylinder.

In the inlet line between the tank and the cylinder is a normally open valve connected to the gear shift lever. This valve is open when the lever is in neutral position, so that at this time pressure fluid is supplied to the cylinder and the clutch is disengaged. The outlet line has a slow discharge valve, and between this valve and the cylinder is a normally closed control valve. The latter is also connected to the gear shift lever and in such a manner that it opens when the lever is shifted in either direction. Thus, in shifting the lever from neutral position, the first named valve closes to cut off supply of fluid to the cylinder, and the control valve opens to permit flow through the discharge line to the slow discharge valve. It will be understood that when the pressure supply fluid is cut off, the usual spring in the clutch forces the piston back and discharges the air from the cylinder.

The slow discharge valve is connected to the accelerator pedal to open more fully when the pedal is depressed. Thus, the discharge valve causes the clutch to engage slowly at first and more rapidly on depression of the pedal, in accordance with good driving practice.

The invention is fully disclosed by way of example in the following description and in the accompanying drawing, in which.

Reference to these views will now be made by use of like characters which are employed to designate corresponding parts throughout.

Figure 1:
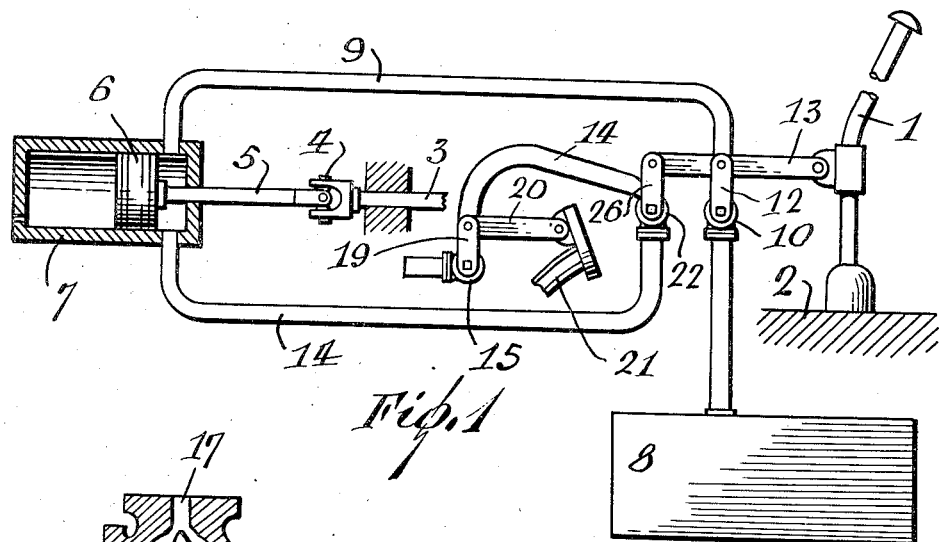
Figure 1 is an elevation of the apparatus.
Figure 2:
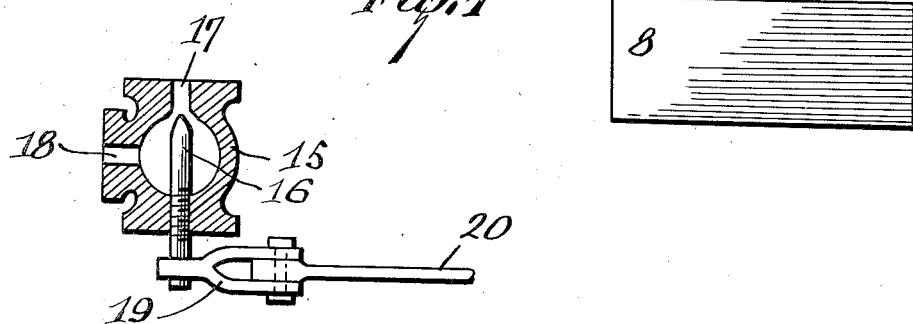
Figure 2 is a cross section of the exhaust valve.

In Figure 1 is shown the conventional gear shift lever 1 of a motor vehicle mounted on the floor 2 of the vehicle in the usual manner. The clutch pedal is removed and replaced by a link 3 to the clutch (not shown) and is connected by a universal joint 4 and link 5 to a piston 6. The piston is contained in a cylinder 7 and disengages the clutch by suitable mechanism, when advanced under pressure in the direction corresponding to the required movement.

Suitably mounted on the vehicle is a tank 8 containing compressed air. The compressed air may be furnished by a compressor driven by the gasoline motor in any suitable manner. A pipe line 9 extends from the tank to the cylinder 7 at the rear side of the piston 6, so that when the line is open, the piston is advanced by compressed air in the clutch-disengaging direction.

Figures 3, 4:
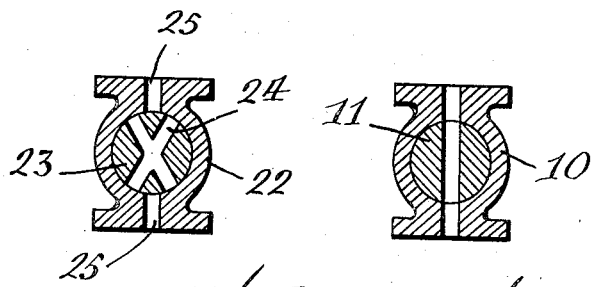
Figure 3 is a cross section of the intermediate stoppage valve.
Figure 4 is a cross section of the admission or starting valve.

In the line 9 is inserted a valve comprising a body 10 and a rotatable plug 11. The latter carries an external stem 12 joined to the lever 1 by a link 13. Thus, actuation of the lever 1 turns the plug 11. When the lever 1 is in neutral position, as in Figure 1, the plug 11 is in the open position shown in Figure 4, whereby compressed air flows to the cylinder 7 and advances the piston 6 to disengage the clutch.

An outlet pipe 14 extends from the cylinder 7 at the rear side of the piston 6 and contains a discharge valve comprising a body 15 and a needle 16 threaded therein. The body has two ports 17 and 18, one of which is in communication with the line 14 and the other of which is the outlet port. To the needle 16 is attached a stem 19 connected by a link 20 to the conventional accelerator pedal 21.

At an intermediate point in the line 14 is a control valve comprising a body 22 and a rotatable plug 23 having crossed passages 24. The valve body 22 has opposed ports 25 communicating with the line 14. The plug 23 has an external stem 26 also pivotally connected to the link 13, as shown in Figure 1. This valve is closed when the lever 1 is in neutral position.

When the lever 1 is shifted in either direction, the valve 10, 11 closes and the valve 22—24 opens. Thus, the supply of compressed air to the cylinder 7 is cut off, and the retraction of the piston 6 under the action of the usual spring in the clutch forces the air into the line 14, through which it is permitted to flow by the open valve 22—24 to the open discharge valve 15, 16. The needle of the latter valve is so adjusted as to permit only a slow discharge and a gradual disengagement of the clutch, in keeping with good driving practice.

As the accelerator 21 is depressed, the engagement of the clutch should be more rapid. Such action is accomplished by the connection to the needle 16, whereby pressure on the accelerator turns the threaded needle to open the valve more widely and permits a more rapid discharge through and hence a more rapid movement of the piston 6 to clutch-engaging position.

In addition to eliminating the need for personally operating the clutch pedal, the invention is well suited for persons learning to drive, since it eliminates the possibility of clashing gears and damaging the transmission mechanism by shifting the lever 1 while the clutch is engaged. By means of the invention, the clutch is always automatically disengaged when the lever 1 is shifted.

Although a specific embodiment of the invention has been illustrated and described, it will be understood that various alterations in the details of construction may be made without departing from the scope of the invention, as indicated by the appended claims.

What we claim is:

1. In an automatic clutch operating mechanism, a cylinder, a piston therein adapted to disengage a clutch, inlet and outlet lines for pressure fluid connected to said cylinder, a normally open admission valve in the inlet line, a normally open discharge valve in the outlet line, an operating lever connected to said admission valve and adapted to close the same when shifted from its neutral position, a normally closed control valve in said outlet line, and means for opening said control valve on shifting said lever from its neutral position.

2. In an automatic clutch operating mechanism, a cylinder, a piston therein adapted to disengage a clutch, inlet and outlet lines for pressure fluid connected to said cylinder, a normally open admission valve in the inlet line, a normally open discharge valve in the outlet line, an operating lever connected to said admission valve and adapted to close the same when shifted from its neutral position, an eccelerator pedal connected to said discharge valve and adapted to open the same more fully when actuated, a normally closed control valve in said outlet line, and means for opening said control valve on shifting said lever from its neutral position.

3. In an automatic clutch operating mechanism, a cylinder, a piston therein adapted to disengage a clutch, inlet and outlet lines for pressure fluid connected to said cylinder, a normally open admission valve in the inlet line, a normally open discharge valve in the outlet line, an operating lever connected to said admission valve and adapted to close the same when shifted from its neutral position, and a normally closed control valve in said outlet line and connected to said lever, said lever being adapted to open said control valve when shifted from its neutral position.

4. In an automatic clutch operating mechanism, a cylinder, a piston therein adapted to disengage a clutch, inlet and outlet lines for pressure fluid connected to said cylinder, a normally open admission valve in the inlet line, a normally open discharge valve in the outlet line, an operating lever connected to said admission valve and adapted to close the same when shifted from its neutral position, a normally closed control valve in said outlet line and connected to said lever, said lever being adapted to open said control valve when shifted from its neutral position, and an accelerator pedal connected to said discharge valve and adapted to open the same more fully when actuated.

5. In an automatic clutch operating mechanism, a cylinder, a piston therein adapted to disengage a clutch, inlet and outlet lines for pressure fluid connected to said cylinder, a normally open admission valve in the inlet line, a normally open discharge valve in the outlet line, an operating lever connected to said admission valve and adapted to close the same when shifted from its neutral position, said discharge valve including a threaded needle controlling the rate of flow therethrough, an accelerator pedal connected to said lever and adapted to turn it to a more fully open position on depression of the pedal, a normally closed control valve in said outlet line, and means for opening said control valve on shifting said lever from its neutral position.

6. In an automatic clutch operating mechanism, a cylinder, a piston therein adapted to disengage a clutch, inlet and outlet lines for pressure fluid connected to said cylinder, a normally open admission valve in the inlet line, a normally open discharge valve in the outlet line, an operating lever connected to said admission valve and adapted to close the same when shifted from its neutral position, said discharge valve including a threaded needle controlling the rate of flow therethrough, an eccelerator pedal connected to said lever and adapted to turn it to a more fully open position on depression of the pedal, and a normally closed control valve in said outlet line and connected to said lever, said lever being adapted to open said control valve when shifted from its neutral position.

GEORGES EMILE BUSSIERES.
JEAN MAURICE BUSSIERES.